(12) United States Patent
Muthuswamy et al.

(10) Patent No.: US 10,916,830 B2
(45) Date of Patent: Feb. 9, 2021

(54) EARBUD SYSTEM

(71) Applicant: Bose Corporation, Framingham, MA (US)

(72) Inventors: Mari Shakthi Muthuswamy, Newton, MA (US); MaoXing Liang, Shenzhen (CN)

(73) Assignee: BOSE CORPORATION, Framingham, MA (US)

( * ) Notice: Subject to any disclaimer, the term of this patent is extended or adjusted under 35 U.S.C. 154(b) by 370 days.

(21) Appl. No.: 15/898,432

(22) Filed: Feb. 17, 2018

(65) Prior Publication Data

US 2019/0260111 A1  Aug. 22, 2019

(51) Int. Cl.
| | |
|---|---|
| *H04R 1/10* | (2006.01) |
| *H04H 20/47* | (2008.01) |
| *H01Q 1/22* | (2006.01) |
| *H04W 76/15* | (2018.01) |
| *H01Q 1/27* | (2006.01) |

(52) U.S. Cl.
CPC .......... *H01Q 1/2291* (2013.01); *H01Q 1/273* (2013.01); *H04R 1/1025* (2013.01); *H04R 1/1041* (2013.01); *H04W 76/15* (2018.02); *H04R 2420/07* (2013.01)

(58) Field of Classification Search
CPC .... H01Q 1/243; H04R 1/1016; H04R 1/1025; H04R 2420/07; H04R 5/033
USPC .................................. 381/74; 455/3.06, 41.2
See application file for complete search history.

(56) References Cited

U.S. PATENT DOCUMENTS

| | | | | |
|---|---|---|---|---|
| 2004/0266501 A1* | 12/2004 | Peek | .................... | H04B 7/0808 455/575.7 |
| 2010/0052998 A1* | 3/2010 | Teng | .................... | H01Q 9/0421 343/702 |
| 2011/0136554 A1* | 6/2011 | Wong | .................. | H04M 1/0235 455/575.4 |
| 2011/0286615 A1* | 11/2011 | Olodort | ................ | H04R 1/1025 381/311 |
| 2012/0115553 A1* | 5/2012 | Mahe | .................... | H04B 7/0825 455/575.7 |
| 2015/0016645 A1* | 1/2015 | Bauman | ................. | H04R 25/48 381/315 |
| 2016/0073189 A1* | 3/2016 | Linden | ................. | H04R 1/1025 381/74 |
| 2017/0295420 A1* | 10/2017 | Yeung | .................... | H04R 5/033 |

* cited by examiner

*Primary Examiner* — George C Monikang
(74) *Attorney, Agent, or Firm* — Schmeiser, Olsen & Watts LLP (57) ABSTRACT

An earbud system is described. The earbud system may include a primary earbud having a primary antenna. The earbud system may further include a secondary earbud having a secondary antenna. The primary antenna may have a higher effective radiation area than the secondary antenna. The secondary antenna may have a higher gain than the primary antenna.

20 Claims, 8 Drawing Sheets

MASTER

FIG. 7

PUPPET

EARBUD SYSTEM

BACKGROUND

This disclosure generally relates to an earbud system. More particularly, this disclosure relates to a wireless earbud system.

SUMMARY

In an example, an earbud system may include a primary earbud having a primary antenna. The earbud system may further include a secondary earbud having a secondary antenna. The primary antenna may have a higher effective radiation area than the secondary antenna. The secondary antenna may have a higher gain than the primary antenna.

One or more of the following features may be included. The frequency band associated with the primary earbud may be offset from a frequency band associated with the secondary earbud. At least one of the higher effective radiation area of the primary antenna and the higher gain of the secondary antenna may improve RF performance relative to at least one of a lower effective radiation area of the primary antenna and a lower gain of the secondary antenna where the earbud system has both a first communication link between an audio source and the primary earbud and a second communication link between the primary earbud and the secondary earbud. At least one of the higher effective radiation area of the primary antenna and the higher gain of the secondary antenna may improve signal reception for communication from the primary antenna to the secondary antenna relative to at least one of a lower effective radiation area of the primary antenna and a lower gain of the secondary antenna where the earbud system has a longer effective signal path length between the primary antenna and the secondary antenna than between the primary antenna and an audio source. At least one of the higher effective radiation area of the primary antenna and the higher gain of the secondary antenna may improve cross body performance of the earbud system relative to at least one of a lower effective radiation area of the primary antenna and a lower gain of the secondary antenna. The offset may prevent collision in communication between the primary earbud and an audio source and communication between the primary earbud and the secondary earbud.

One or more of the following features may be included. The primary earbud may have a uniform ground plane such that there is substantially uniform current flow at an edge of a printed circuit board on the primary earbud. The secondary antenna may have an increased distance between a feed and a first bend as compared to the primary antenna. At least one of the primary antenna and the secondary antenna may be a meander inverted F antenna. At least one of the first communication link and the second communication link may be a Bluetooth communication link. At least one of the primary earbud and the secondary earbud may include one or more pogo pins for charging. At least one of the primary earbud and the secondary earbud may include one or more buttons for a user interface.

One or more of the following features may be included. The primary earbud may be configured to communicate with at least one of the secondary earbud and an audio source. The primary earbud may be configured to communicate via Bluetooth with at least one of the secondary earbud and an audio source. The gain of the secondary antenna may be at least about 2 dB higher than the gain of the primary antenna. An antenna copper area of the primary antenna may be at least about 0.038 sq. cm larger than an antenna copper area of the secondary antenna. The primary earbud and the secondary earbud may be configured to communicate using True Wireless Stereo. A battery may be positioned underneath a printed circuit board of at least one of the primary earbud and the secondary earbud. The earbud system may be a wireless earbud system and the primary antenna may be configured to communicate with both an audio source and the secondary antenna wirelessly.

In an example, an earbud system may include a primary earbud having a primary antenna. The earbud system may further include a secondary earbud having a secondary antenna. The primary antenna may have a higher effective radiation area than the secondary antenna.

In an example, an earbud system may include a primary earbud having a primary antenna. The earbud system may further include a secondary earbud having a secondary antenna. The secondary antenna may have a higher gain than the primary antenna.

One or more of the following features may be included. A frequency band associated with the primary earbud may be offset from a frequency band associated with secondary earbud. The offset may prevent collision in communication between the primary earbud and an audio source and communication between the primary earbud and the secondary earbud. The primary earbud may be configured to communicate via Bluetooth with at least one of the secondary earbud and an audio source. The primary antenna may have a higher effective radiation area than the secondary antenna.

In an example, an earbud system may include a primary earbud having a primary antenna. The earbud system may further include a secondary earbud having a secondary antenna. A frequency band associated with the primary earbud may be offset from a frequency band associated with the secondary earbud.

One or more of the following features may be included. The offset may prevent collision in communication between the primary earbud and an audio source and communication between the primary earbud and the secondary earbud. The primary earbud may be configured to communicate via Bluetooth with at least one of the secondary earbud and an audio source.

BRIEF DESCRIPTION OF THE DRAWINGS

The above and further aspects of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

In brief overview, an earbud system may include a primary earbud having a primary antenna. The earbud system may further include a secondary earbud having a secondary antenna. The primary antenna may have a higher effective radiation area than the secondary antenna. The secondary antenna may have a higher gain than the primary antenna.

An earbud system may be worn by a person wishing to listen to music or audio. The earbud system may include a right earbud and a left earbud. The right earbud may be positioned in or near the right ear of the person. The left earbud may be positioned in or near the left ear of the person. The earbud system may be communicably coupled to an audio source (e.g., a mobile phone, portable music player, tablet, computer, etc.) and may receive the music or audio (e.g., voice) from the audio source. The earbud system may be a wireless earbud system and communication between the right earbud, the left earbud, and the audio source may occur wirelessly (i.e., without wires connecting the right and left earbuds or connecting the right or left earbud to the audio source).

In an example, the earbud system may include a primary earbud and a secondary earbud. The primary earbud may also be referred to as a master earbud or master and these terms may be used interchangeably. The secondary earbud may also be referred to as a slave earbud, slave, puppet earbud, or puppet and these terms may be used interchangeably. The primary earbud may be discussed herein as the earbud designed to be positioned in or near the right ear of a person and the secondary earbud may be discussed herein has the earbud designed to be positioned in or near the left ear of the person, however this is not a limitation of the present disclosure as various implementations may include a primary earbud designed to be positioned in or near the left ear of the person and a secondary earbud designed to be positioned in or near the right ear of the person. In the latter case, the left earbud may be configured to be the master and the right earbud maybe configured to be the puppet.

The primary earbud may include a primary antenna which may also be referred to as a master antenna. The secondary earbud may include a secondary antenna which may also be referred to as a slave antenna or puppet antenna.

Figure 1:
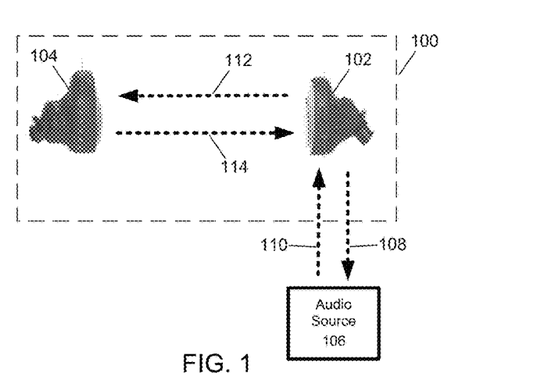
FIG. 1 depicts an example earbud system in accordance with the present disclosure.

Referring now to FIG. 1, an example earbud system 100 is shown. Earbud system 100 may include primary earbud or right earbud 102 and secondary earbud or left earbud 104. Right earbud 102 may communicate with audio source 106. Right earbud 102, left earbud 104, and audio source 106 may use Bluetooth communication to communicate using True Wireless Stereo architecture or standard (available from Qualcomm Technologies International, Ltd.), but this is not intended to be a limitation as other communications standards and protocols are within the scope of the present disclosure.

Right and left earbuds 102 and 104 may each have processors or integrated circuits (ICs) inside a corresponding housing. The processors or ICs may be mounted on a printed circuit board (PCB) and printed circuit board assemblies (PCBAs) may be integrated in each earbud. For example, the earbuds may include ICs manufactured by CSR (e.g., CSR 8670) to implement Bluetooth communication. The earbuds also may include batteries integrated or mounted to the PCBAs. Right earbud 104 may also include one or more microphones, buttons (e.g., 3 buttons), and other circuitry. Left earbud 104 may also include one or more buttons and other circuitry.

Earbud system 100 may use various Bluetooth profiles for communication among right earbud 102, left earbud 104, and audio source 106. As indicated by wireless communication line 108, right earbud 102 may communicate with audio source 106 via Audio/Video Remote Control Profile (AVRCP) to control media playback on audio source 106. As indicated by wireless communication line 110, audio source 106 may communicate with right earbud 102 via AVRCP and also via Advanced Audio Distribution Profile (A2DP) to stream audio and via Hands-Free Profile (HFP) for telephone calls. As indicated by wireless communication line 112, right earbud 102 may communicate with left earbud 104 via A2DP and AVRCP. As indicated by wireless communication line 114, left earbud 104 may communicate with right earbud 102 via AVRCP. Thus, two communication links may be established by earbud system 100: one between primary or right earbud 102 and audio source 106 and another between primary or right earbud 102 and secondary or left earbud 104. In other words, secondary or left earbud 104 may only receive audio communications from primary or right earbud 102 and not from the audio source 106.

Reliable communication between the two earbuds may be difficult to achieve while the master earbud stays connected to an audio source. Additionally, antenna performance for each earbud may be negatively affected by a battery positioned underneath a corresponding PCBA, one or more pins (e.g., pogo pins) for charging, one or more integrated microphones, and one or more buttons for each earbud. One or more of these features, and in particular the battery placement, may cause the total antenna efficiency in free space to drop, in some examples, from about 70% to about 45%. Proximity of the battery underneath the PCBA and the antenna radiating element thus may reduce antenna efficiency substantially. This problem may be compounded by a desire to use as large a battery as possible for each earbud in order to maximize available power.

A limitation in earbud design may be that a standard transmit power for a given processor or IC being used may be fixed. Various design considerations may be used to minimize noise in the earbud and make sure that the power output transmitted is as high as possible. Similarly, receive power for a given processor or IC being used may be fixed, but it may also be desirable to maximize the receive power limitation. Using the same antenna design in both earbuds of an earbud system with maximum power output from both antennas may lead to poor antenna performance.

Figure 2:
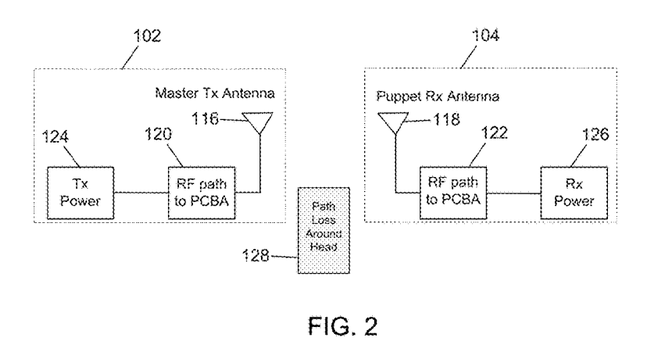
FIG. 2 shows an example schematic corresponding to the earbud system of FIG. 1 in accordance with the present disclosure.

One way to maximize antenna efficiency may be to optimize battery location with respect to an antenna in each earbud. For example, by placing the battery as far away from the antenna as possible (e.g., not directly under the antenna), higher antenna efficiency may be achieved. When the battery is positioned under the antenna, impedance may become low. However, given space constraints in earbuds, it often is not possible to optimize the battery location relative to the antenna. In such cases, antenna efficiency may be increased by increasing an effective radiation area of the antenna, in particular for the primary or master antenna, as compared to the secondary or puppet antenna. Referring now to FIG. 2, an example schematic corresponding to earbud system 100 is shown to initially describe how various techniques and features detailed in the present disclosure can be implemented to improve antenna efficiency and other performance characteristics (e.g., total radiation pattern) of an earbud system.

Right or master earbud 102 may include a primary or master antenna 116 and left or puppet earbud 104 may include a secondary or puppet antenna 118. The earbuds may experience power loss in a path to or from the antennas. For example, block 120 of master earbud 102 may represent RF path PCBA components and trace loss. Further, block 122 of puppet earbud 102 may represent RF path PCBA components and trace loss. The transmit power of master earbud 102 may be represented by block 124 and may be, for example, a maximum of 8 dBm in the case of a CSR 8670 IC. The practically attainable receive power of slave earbud 104 may be represented by block 126 and may be, for example, greater than −90 dBm in the case of a CSR 8670 IC.

Block 128 may represent a radiated path loss around a human head. In an implementation, a measured Effective Isotropic Radiated Power (EIRP) for master earbud 102 at 2.44 GHz may be about 6.8-7.2 dBm and a measured EIRP for puppet earbud 104 may be about 8.6-9.5 dBm, where EIRP=Pt (Conducted Output Power of transmitter)−Tlss (RF path PCBA components and trace loss)+Ga (Antenna Gain).

Figure 3:
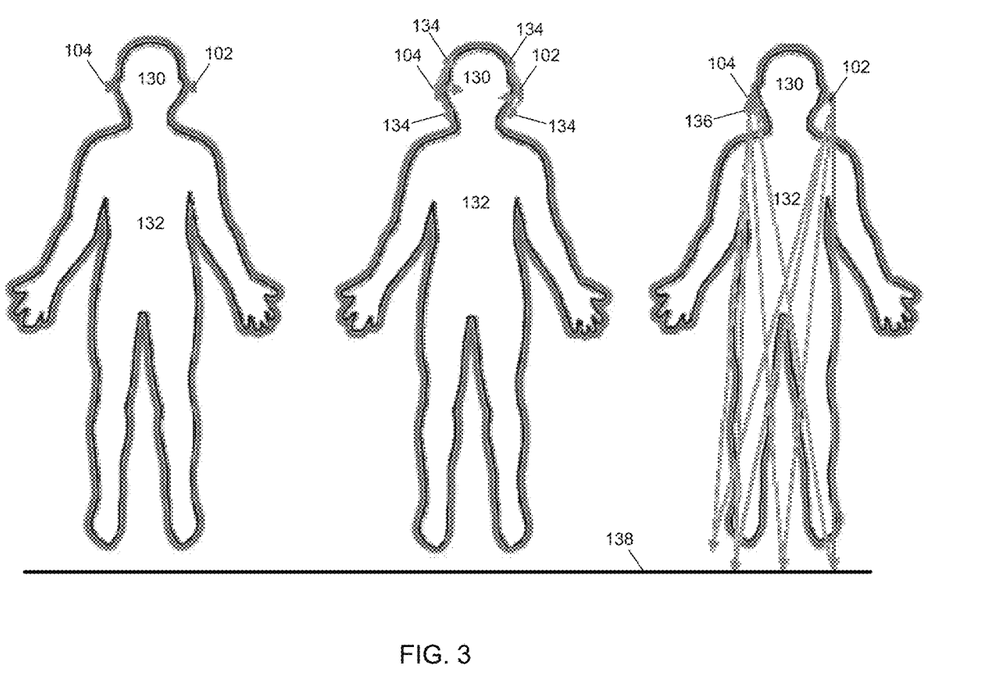
FIG. 3 shows examples of direct and indirect communication paths across a body in accordance with the present disclosure.

Referring now to FIG. 3, an RF path loss from primary earbud 102 to secondary earbud 104 in an earbud system may occur due to the earbuds being separated in space by the user's head (e.g., head 130). A direct path (e.g., indicated by arrow 134) around the user's head from primary earbud 102 to secondary earbud 104 may exist but is a weak path due to obstruction by the human head. There are, however, indirect paths from primary earbud 102 to secondary earbud 104. The indirect paths may include situations where the RF path bounces off of reflective surfaces (e.g., walls, nearby structures, the ground, etc.) where the user is using the earbuds. In particular, the RF path may travel from one earbud (e.g., the primary or master earbud) to the ground (e.g., ground 138) before reflecting (e.g., as indicated by arrow 136) to the other earbud (e.g., the secondary or puppet earbud). The path length of the RF signals reflecting off ground and reaching the secondary earbud 104 may be longer than that of the master earbud's worst-case audio source location, which may be across a user's body. This consideration (e.g., RF signals reflecting from ground to secondary or puppet earbud 104) may lead to a design where the secondary earbud or puppet earbud has a higher gain in the antenna, and in particular, as compared to the primary or master earbud.

For communications between the master earbud and the audio source (for the case when the master earbud is located in a user's right ear), the worst case direct RF path may be when the audio source is in the user's left pant pocket (front or back), and the direct path is still around or on the surface of the user's body and may be weak. The indirect paths in this situation may also include RF signal reflections from the ground back up to the master earbud or the audio source. Thus, the antennas in the earbuds may be designed to output RF field energy behind the user and towards the ground.

For the two earbuds to communicate reliably while the master earbud stays connected to the audio source, the antenna design of the master earbud and the puppet earbud may need to be different. For example, increasing the effective radiation area of the primary antenna compared to the secondary antenna and/or increasing the gain of the secondary antenna compared to the primary antenna may have a positive impact on the overall RF performance of the earbud system.

Figure 4:
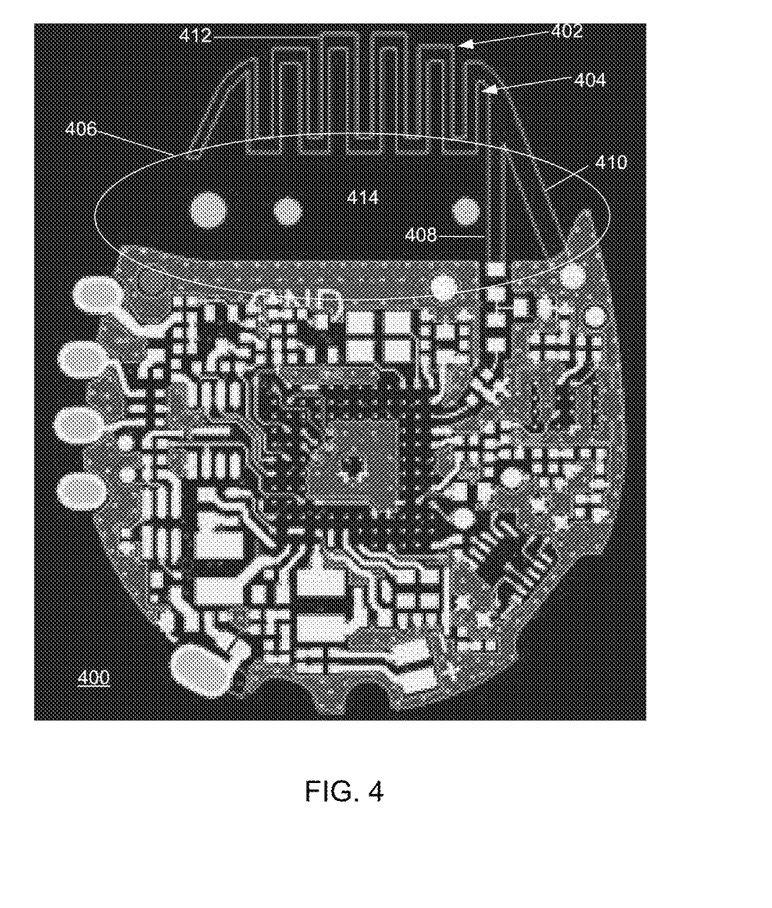
FIG. 4 shows an example top view of a PCBA of a master earbud in accordance with the present disclosure.

Referring now to FIG. 4, an example primary earbud is shown from the top view of the PCBA 400. An antenna 402 may be a meander inverted F antenna (though other antenna configurations may be used) with more effective radiation area (i.e., transmitting antenna effective area) than the corresponding secondary earbud. Antenna 402 of the primary earbud may be designed to have an increased effective radiation area (404). This may increase RF performance of the primary earbud because the primary antenna (e.g., antenna 402) may have to transmit and receive at the same time. For example, the primary antenna may have to receive from the audio source and transmit to the secondary antenna of a secondary earbud at the same time.

Further, the PCBA 400 having antenna 402 may have a uniform ground plane (406) which may facilitate continuous flow of antenna return current. In other words, the ground plane of the primary antenna may be adjusted for uniform current flow at the edge of the main electronics on the PCBA. Thus, antenna 402 may have uniform antenna return current flow in the ground. In various implementations, pogo pins and mechanical buttons may be located below the ground plane boundary with a keep-out for the antenna. This may aid uniform antenna return current. The ground plane may be located above these elements so an impact of the battery's (e.g., 85 mAhr battery) mechanical placement is also below a ground return mark.

A primary earbud, which may include, for example, PCBA 400 or similar, may have an antenna copper area of about 0.24 sq. cm. For example, an exact antenna copper area of PCBA 400 may be 0.2418 sq. cm. PCBA 400 may have an antenna feed 408 with a length of about 5 mm and a width of about 0.5 mm. Further, PCBA 400 may have an antenna short 410 with a length of about 4.6 mm and a width of about 0.8 mm. Additionally, PCBA 400 may have a radiating element 412 with a length of about 45 mm and a width of about 0.3 mm. Also, PCBA 400 may have a slot 414 with a length of about 11 mm and a width of about 3.75 mm.

Figure 5:
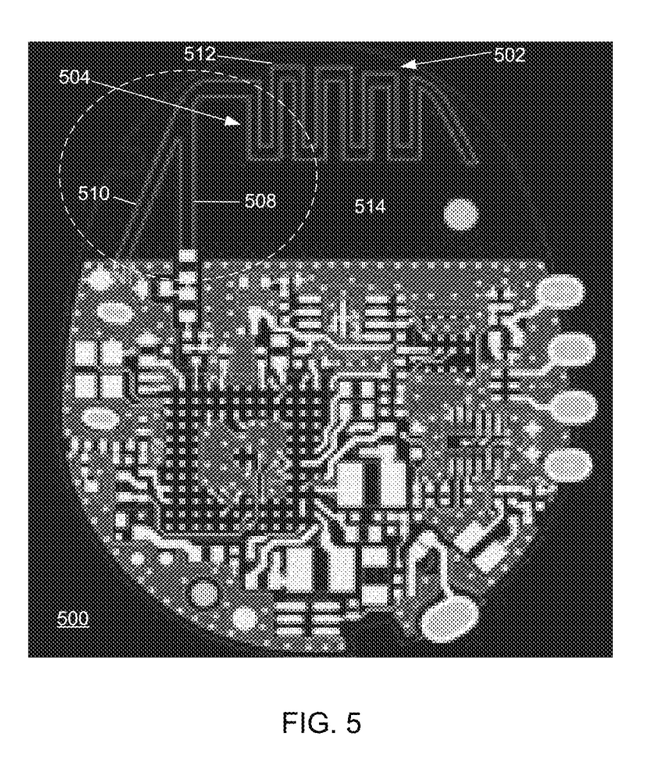
FIG. 5 shows an example top view of a PCBA of a puppet earbud in accordance with the present disclosure.

Referring now to FIG. 5, an example secondary earbud is shown from the top view of the PCBA 500. An antenna 502 of the secondary earbud may also be a meander inverted F antenna (though other antenna configurations may be used). Antenna 502 of the secondary earbud may be designed to have an increased distance (504) between a feed and a first meander bend in the antenna as compared to a corresponding primary antenna (e.g., antenna 402), thereby increasing the bandwidth and gain relative to the primary antenna.

A secondary earbud, which may include, for example, PCBA 500 or similar, may have an antenna copper area of about 0.20 sq. cm. For example, an exact antenna copper area of PCBA 500 may be 0.2038 sq. cm. PCBA 500 may have an antenna feed 508 with a length of about 5 mm and a width of about 0.5 mm. Further, PCBA 500 may have an antenna short 510 with a length of about 5.9 mm and a width of about 0.45 mm. Additionally, PCBA 500 may have a radiating element 512 with a length of about 38 mm and a width of about 0.3 mm. Also, PCBA 500 may have a slot 514 with a length of about 11 mm and a width of about 4 mm. The antenna copper area of the primary antenna may be at least about 0.038 sq. cm larger than the antenna copper area of the secondary antenna.

Further, for the two earbuds (i.e., master and puppet) to communicate reliably with each other while the master earbud stays connected to the audio source, the antenna design of the master earbud and the puppet earbud may be configured so that the puppet antenna's gain is higher than the master antenna and a communication band (e.g., Bluetooth) is offset from the master antenna as compared to the puppet antenna. This may have an impact on the overall RF performance of the earbud system. Having the master and puppet antennas designed differently may also aid in preventing collisions in the two communication links (e.g., between the audio source and the master earbud and between the master earbud and the puppet earbud) due to interference.

For example, Bluetooth may operate in the 2.4 GHz band using 79 channels, in 1 MHz spacing, from 2402 MHz up to 2480 MHz. Bluetooth may be less susceptible to jamming or interference than, for example, Wi-Fi, because Bluetooth may use frequency-hopping spread spectrum (FHSS). This means the signal may "hop" from one channel to another, using a pseudorandom sequence known to both the transmitter and receiver. This may occur 1600 times a second (every 625 μS). Still, two Bluetooth communications can collide (during the hops) with each other or with other Bluetooth, Wi-Fi, or other 2.4 GHz band devices in the vicinity. Bluetooth may also employ adaptive frequency hopping (AFH) which means it may only use "good" frequencies, and avoids "bad" frequencies, i.e., the frequencies that are preoccupied by other wireless devices and communication links.

Figure 6:
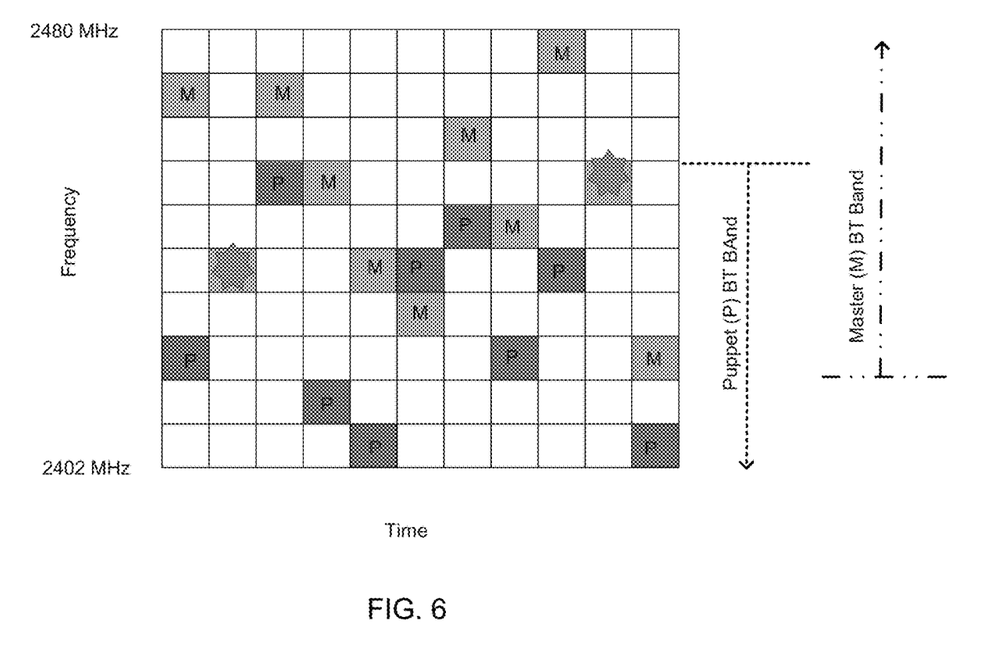
FIG. 6 depicts an example illustration of avoidance of frequency hop collisions due to center frequency offset in accordance with the present disclosure.

Referring now to FIG. 6, an illustration is shown to depict the issue of collisions between the master earbud/antenna communication band and the puppet earbud/antenna communication band. The illustration may be based on Bluetooth communications and is for illustrative purposes only as not all 79 channels are shown. The master communication band may not include certain lower frequency channels and master channel hops may be marked with an "M". The puppet communication band may not include certain higher frequency channels and puppet channel hops may be marked with a "P". As shown in channels used by both the master and the puppet, there may be collisions or interference (illustrated by a star).

Figure 7:
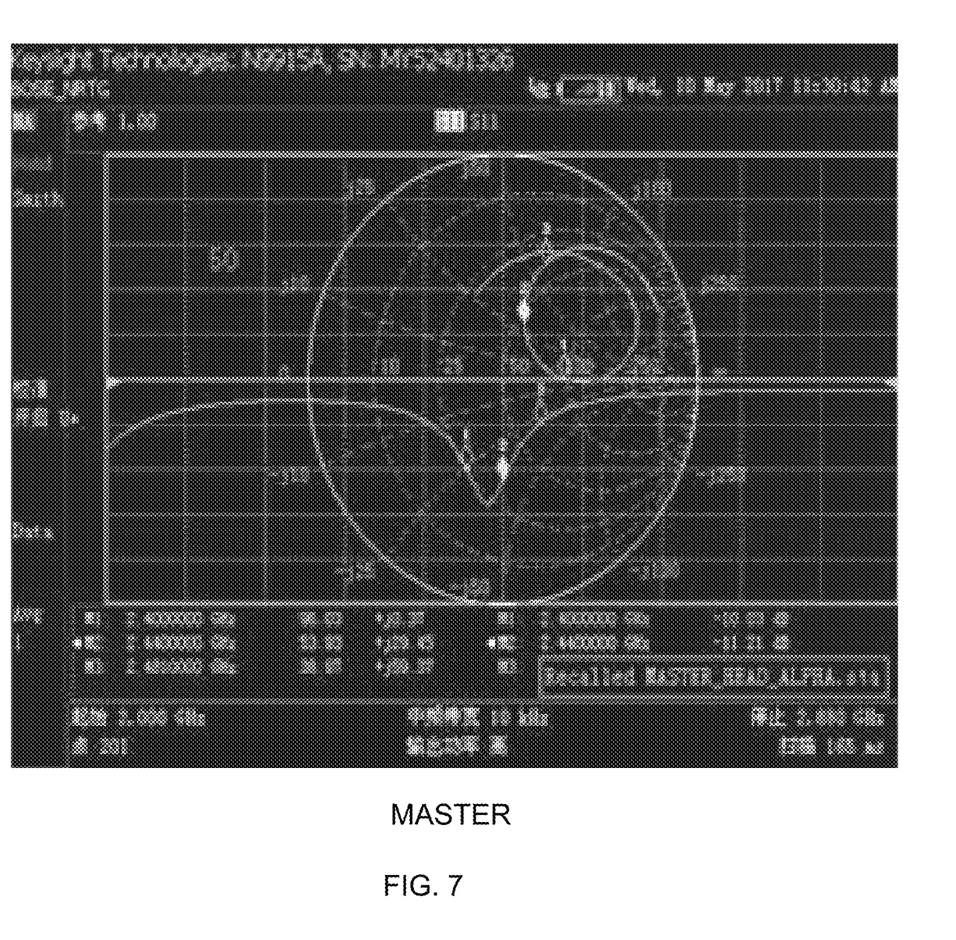
FIG. 7 and FIG. 8 show example antenna return ratio plots depicting a center frequency band offset between a master earbud and a puppet earbud in accordance with the present disclosure.
Figure 8:
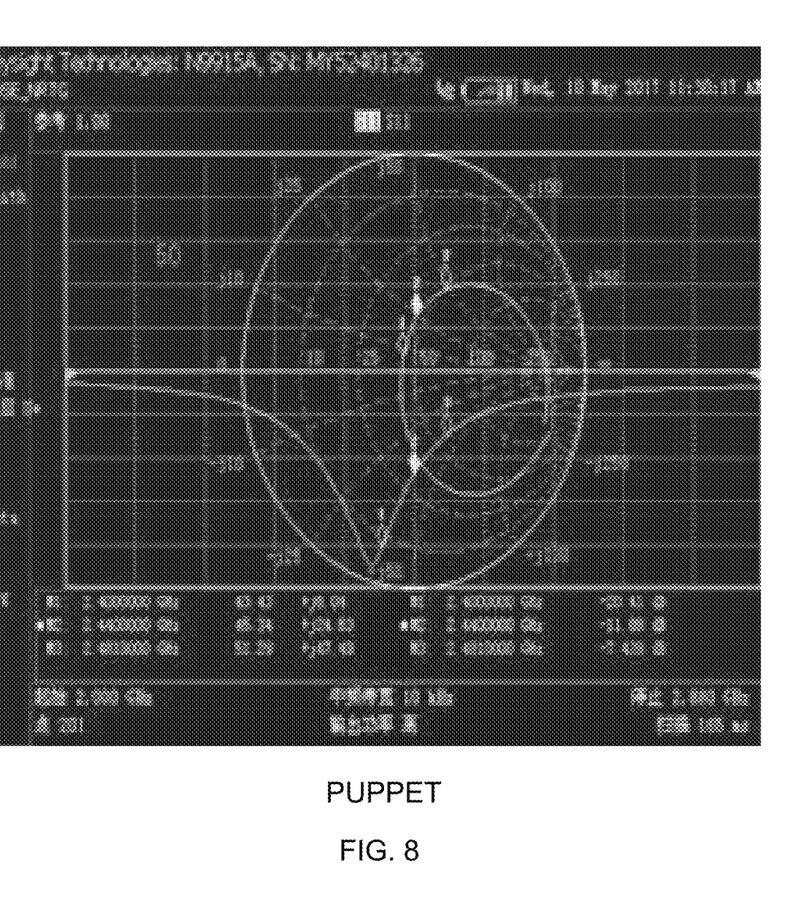
Figure 9:
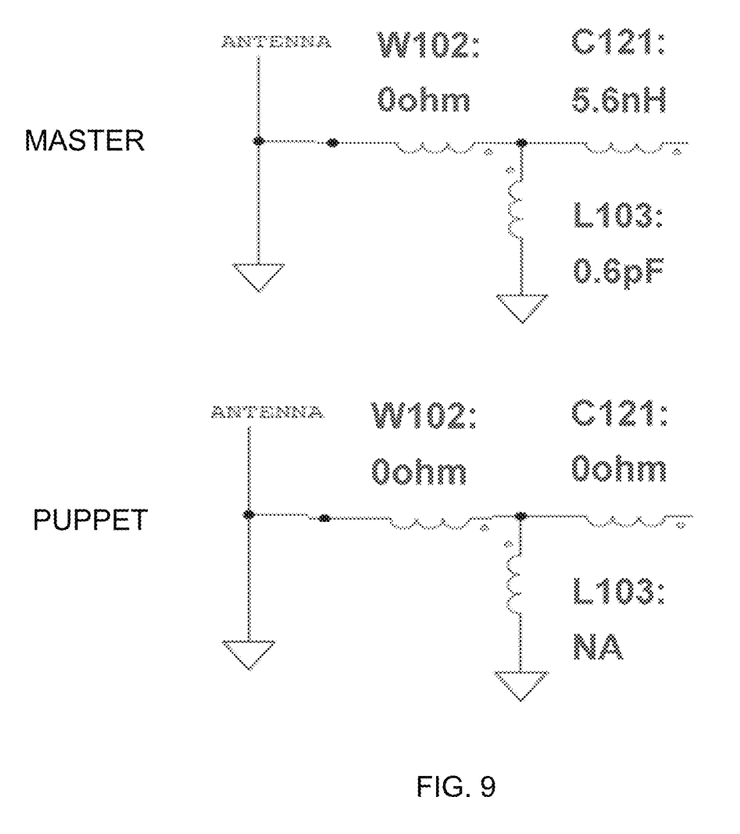
FIG. 9 depicts an example illustration of how frequency band offset may be controlled using tuning components on a master earbud PCB and a puppet earbud PCB in accordance with the present disclosure.

Referring now to FIG. 7 and FIG. 8, example antenna return ratio plots for a master earbud (FIG. 7) and a puppet earbud (FIG. 8) are shown. These plots show a frequency band difference and a center frequency offset between master and puppet antennas as measured using a vector network analyzer. Referring now to FIG. 9, example tuning components for controlling the center frequency offset are shown. The offset may be controlled and managed by making adjustments using various passive tuning components on the PCBs of the master and puppet earbuds. The tuning components may be positioned before an antenna feed. For example, the master and puppet antennas may be etched on their respective PCBs. To shift the center frequency of the puppet to be offset from the master, the tuning components on the PCBs (i.e., on both master and puppet) that connect to the respective feeds of the etched inverted F antennas may be used.

As discussed, an earbud design may include the longer RF path for signals between the master and the puppet (e.g., to reflect off the ground) and the desire to reduce channel collisions and interference. In order to address these considerations, the puppet antenna may be set to a higher gain and an EIRP of about 2-3 dBm more than the master antenna. This may be achieved by increasing the distance between the feed and the first meander of the inverted F etched antenna. Further, the communication band (e.g., for Bluetooth) for the puppet may be offset from the master and this may help avoid the master/puppet interference collision. Also, using one or more of these techniques and features, the cross body wireless performance of the earbud system may be improved, particularly outdoors where there are fewer opportunities for reflections.

It has been shown that if a master earbud and a puppet earbud (or master PCBA/antenna and puppet PCBA/antenna) in a wireless earbud system are designed identically or near identically, the communications between the earbuds and between the earbuds and the audio source may be not be optimal, sustainable, or reliable. Thus, the techniques and features of the present disclosure for creating and implementing different designs for the master earbud and a puppet earbud (or master PCBA/antenna and puppet PCBA/antenna) may be used to achieve more reliable communication, greater RF performance, and stronger communication reliability. In particular, using the techniques and features of the present disclosure, cross body performance (e.g., communications between a master earbud in a right ear and an audio source in, for example, a left pocket) may be improved.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. An earbud system comprising:
a primary earbud having a primary antenna;
a secondary earbud having a secondary antenna; and
wherein the primary antenna has a higher effective radiation area than the secondary antenna and the secondary antenna has a higher gain than the primary antenna, and wherein the secondary antenna has an increased distance between a feed and a first bend as compared to the primary antenna.

2. The earbud system of claim 1, wherein a frequency band associated with the primary earbud is offset from a frequency band associated with the secondary earbud.

3. The earbud system of claim 1, wherein at least one of the higher effective radiation area of the primary antenna and the higher gain of the secondary antenna improves RF performance relative to at least one of a lower effective radiation area of the primary antenna and a lower gain of the secondary antenna where the earbud system has a first communication link between an audio source and the primary earbud and a second communication link between the primary earbud and the secondary earbud.

4. The earbud system of claim 1, wherein at least one of the higher effective radiation area of the primary antenna and the higher gain of the secondary antenna improves signal reception for communication from the primary antenna to the secondary antenna relative to at least one of a lower effective radiation area of the primary antenna and a lower gain of the secondary antenna where the earbud system has a longer effective signal path length between the primary antenna and the secondary antenna than between the primary antenna and an audio source.

5. The earbud system of claim 1, wherein at least one of the higher effective radiation area of the primary antenna and the higher gain of the secondary antenna improves cross body performance of the earbud system relative to at least one of a lower effective radiation area of the primary antenna and a lower gain of the secondary antenna.

6. The ear bud system of claim 2, wherein the offset prevents collision in communication between the primary earbud and an audio source and communication between the primary earbud and the secondary earbud.

7. The earbud system of claim 1, wherein the primary earbud has a uniform ground plane such that there is substantially uniform current flow at an edge of a printed circuit board on the primary earbud.

8. The earbud system of claim 1, wherein at least one of the primary antenna and the secondary antenna is a meander inverted F antenna.

9. The earbud system of claim 3, wherein at least one of the first communication link and the second communication link is a Bluetooth communication link.

10. The earbud system of claim 1, wherein at least one of the primary earbud and the secondary earbud includes one or more pogo pins for charging.

11. The earbud system of claim 1, wherein at least one of the primary earbud and the secondary earbud include one or more buttons for a user interface.

12. The earbud system of claim 1, wherein the gain of the secondary antenna is at least about 2 dB higher than the gain of the primary antenna.

13. The earbud system of claim 1, wherein an antenna copper area of the primary antenna is at least about 0.038 sq. cm larger than an antenna copper area of the secondary antenna.

14. The earbud system of claim 1, wherein the primary earbud and the secondary earbud are configured to communicate using True Wireless Stereo.

15. The earbud system of claim 1, wherein a battery is positioned underneath a printed circuit board of at least one of the primary earbud and the secondary earbud.

16. An earbud system comprising:
a primary earbud having a primary antenna;
a secondary earbud having a secondary antenna; and
wherein the primary antenna has a higher effective radiation area than the secondary antenna and the secondary antenna has a higher gain than the primary antenna, and
wherein an antenna copper area of the primary antenna is at least about 0.038 sq. cm larger than an antenna copper area of the secondary antenna.

17. The earbud system of claim 16, wherein a frequency band associated with the primary earbud is offset from a frequency band associated with the secondary earbud.

18. The earbud system of claim 16, wherein at least one of the higher effective radiation area of the primary antenna and the higher gain of the secondary antenna improves RF performance relative to at least one of a lower effective radiation area of the primary antenna and a lower gain of the secondary antenna where the earbud system has a first communication link between an audio source and the primary earbud and a second communication link between the primary earbud and the secondary earbud.

19. The earbud system of claim 16, wherein at least one of the higher effective radiation area of the primary antenna and the higher gain of the secondary antenna improves signal reception for communication from the primary antenna to the secondary antenna relative to at least one of a lower effective radiation area of the primary antenna and a lower gain of the secondary antenna where the earbud system has a longer effective signal path length between the primary antenna and the secondary antenna than between the primary antenna and an audio source.

20. The earbud system of claim 16, wherein at least one of the higher effective radiation area of the primary antenna and the higher gain of the secondary antenna improves cross body performance of the earbud system relative to at least one of a lower effective radiation area of the primary antenna and a lower gain of the secondary antenna.

\* \* \* \* \*